(No Model.)
H. S. MILLER.
SWIVEL PIPE COUPLING.
No. 353,154. Patented Nov. 23, 1886.
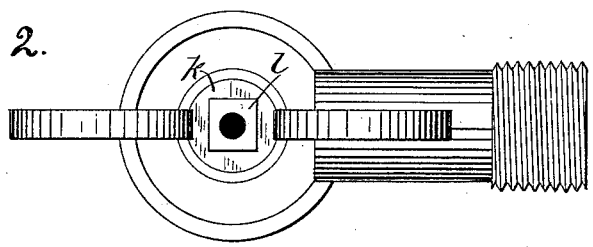
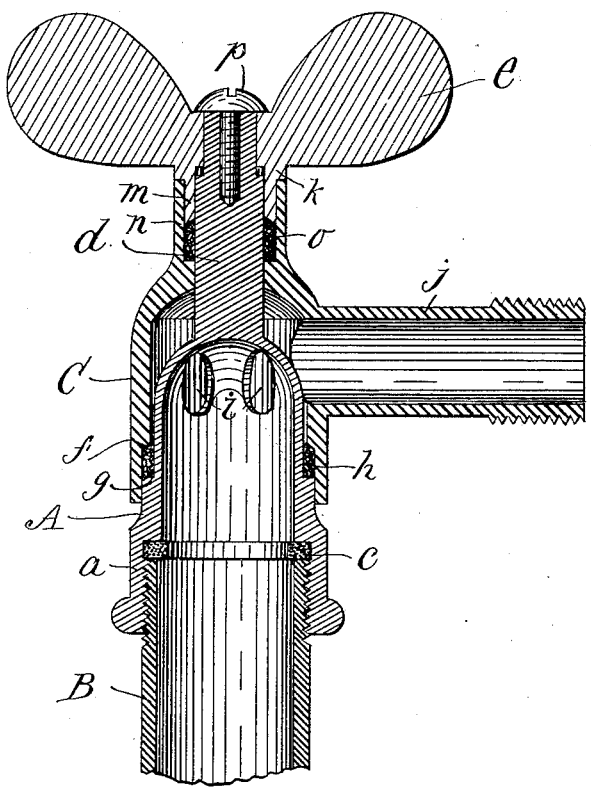
Witnesses
V. M. Hood.
H. P. Randall.
Inventor
Harrison S. Miller.
By His Attorney H. P. Hood.

United States Patent Office.

HARRISON S. MILLER, OF INDIANAPOLIS, INDIANA, ASSIGNOR OF ONE-HALF TO PATRICK J. FREANEY, OF SAME PLACE.

SWIVEL PIPE-COUPLING.

SPECIFICATION forming part of Letters Patent No. 353,154, dated November 23, 1886.

Application filed July 1, 1886. Serial No. 206,779. (No model.)

*To all whom it may concern:*

Be it known that I, HARRISON S. MILLER, a citizen of the United States, residing at Indianapolis, in the county of Marion and State of Indiana, have invented a new and useful Improvement in Swivel Pipe-Couplings, of which the following is a specification.

My invention relates to an improvement in that class of pipe-couplings which are used for coupling hose to water-supply pipes for sprinkling purposes about private residences.

The object of my improvement is to provide a swivel-coupling which may be cheaply constructed of few parts, and which may be quickly and conveniently secured to the water-supply pipe.

The accompanying drawings illustrate my invention.

Figure 1 is a central vertical section. Fig. 2 is a plan.

A is a hollow coupling having an interiorly screw-threaded socket, $a$, adapted to engage the supply-pipe B, which makes a tight joint against the gasket $c$. The upper end of coupling A is semi-spherical and terminates in a solid cylindrical stem, $d$, the upper end of which is squared to receive the thumb-wrench $e$.

C is a hollow chamber fitting nicely over stem $d$ and that portion of coupling A immediately above the socket $a$, so as to turn thereon.

Chamber C is provided with an interior annular shoulder, $f$, between which and a similar shoulder, $g$, on the coupling A is a soft packing, $h$. The outside of the upper semi-spherical portion of coupling A is smaller in diameter than the inside of the upper portion of chamber C, and the interior of the coupling communicates with the interior of the chamber through several openings, $i$, in the walls of the coupling. A branch pipe, $j$, formed integral with chamber C and communicating with its interior, is screw-threaded to receive the ordinary hose-coupling.

The thumb-wrench $e$ has a central hub, $k$, in the upper part of which is a square opening, $l$, which fits over the square end of stem $d$, and the lower part forms an annular flange, $m$, which enters a recess, $n$, in the upper part of chamber C, and forms, with the packing $o$, a stuffing-box which prevents leakage about stem $d$, the wrench being secured to the stem and forced down upon the packing by a screw, $p$. When thus secured, chamber C is free to turn upon the coupling A, and the water passes from the supply-pipe through the coupling into the chamber and out through the branch pipe $j$.

I claim as my invention—

The above-described swivel-coupling, consisting of the hollow coupling A, having socket $a$, shoulder $g$, stem $d$, and openings $i$, chamber C, having shoulder $f$ and recess $n$, branch pipe $j$, the thumb-wrench $e$, having flange $m$, the packing $o$, and packing $h$, all combined substantially as specified.

HARRISON S. MILLER.

Witnesses:
H. P. HOOD,
V. M. HOOD.